United States Patent
Jackson

(10) Patent No.: US 8,439,060 B1
(45) Date of Patent: May 14, 2013

(54) ATTACHABLE DRAIN COLLAR FOR PLUMBING SYSTEM COUPLINGS

(76) Inventor: Gregory G. Jackson, Houston, TX (US)

( * ) Notice: Subject to any disclaimer, the term of this patent is extended or adjusted under 35 U.S.C. 154(b) by 374 days.

(21) Appl. No.: 12/769,706

(22) Filed: Apr. 29, 2010

(51) Int. Cl.
   *B65B 1/04* (2006.01)
   *B65B 3/04* (2006.01)

(52) U.S. Cl.
   USPC .................................. 137/1; 137/312; 285/13

(58) Field of Classification Search .................. 137/312, 137/375, 1, 15.11; 285/13, 45; 138/97; 141/86, 141/88
   See application file for complete search history.

(56) References Cited

U.S. PATENT DOCUMENTS

| | | | | |
|---|---|---|---|---|
| 441,141 | A * | 11/1890 | Dalton | 137/312 |
| 2,699,960 | A * | 1/1955 | Callery et al. | 285/13 |
| 2,954,797 | A * | 10/1960 | Dryer | 137/312 |
| 3,603,508 | A | 9/1971 | Ingram | |
| 3,792,711 | A | 2/1974 | Bedard | |
| 4,061,368 | A | 12/1977 | Auriemma | |
| 4,207,918 | A * | 6/1980 | Burns et al. | 137/375 |
| 4,273,367 | A | 6/1981 | Keeney et al. | |
| 4,795,197 | A | 1/1989 | Kaminski et al. | |
| 4,807,669 | A * | 2/1989 | Prestidge, Sr. | 137/375 |
| 5,018,770 | A | 5/1991 | Beasley | |
| 5,094,480 | A | 3/1992 | Boileau | |
| 5,348,044 | A * | 9/1994 | Eugene et al. | 137/312 |
| 5,671,655 | A | 9/1997 | Vollrath | |
| 6,164,345 | A * | 12/2000 | Haddox | 137/312 |
| 6,244,290 | B1 * | 6/2001 | Reicin et al. | 137/312 |
| 6,302,445 | B1 | 10/2001 | Kugele et al. | |
| 6,491,056 | B2 | 12/2002 | Gibb | |
| 6,655,498 | B1 | 12/2003 | Sasa et al. | |
| 7,628,428 | B2 * | 12/2009 | Rampton et al. | 285/45 |

* cited by examiner

*Primary Examiner* — Kevin Lee
(74) *Attorney, Agent, or Firm* — Robert C. Montgomery; Montgomery Patent & Design

(57) ABSTRACT

A draining device for controlled drainage of internal water in plumbing systems comprises a semi-circular plastic collar that engages around a bottom of a pipe coupling. The collar covers the bottom of the coupling fitting and forms a watertight seal against sides of the pipe wall using an integral gasket. The collar is held in place around an upper side of the pipe using a pair of straps and strap fasteners. A hose connection fitting is provided on a bottom of the collar to provide a connection to a hose or other temporary plumbing, thereby providing drainage of water in a controlled manner.

19 Claims, 3 Drawing Sheets

ATTACHABLE DRAIN COLLAR FOR PLUMBING SYSTEM COUPLINGS

RELATED APPLICATIONS

The present invention was first described in a notarized Official Record of Invention on Nov. 19, 2008, that is on file at the offices of Montgomery Patent and Design, LLC, the entire disclosures of which are incorporated herein by reference.

FIELD OF THE INVENTION

The present invention relates generally to pipe coupling fittings, and more particularly, to an attachable drain fitting for plumbing system couplings.

BACKGROUND OF THE INVENTION

The field of fire sprinkler installation and maintenance has many specialized tools, but one (1) important tool is still missing. Often times during testing or after activation of a sprinkler system the pipe line must be drained, especially those systems that are dry systems or are pre-activated. While a main drain valve can eliminate much of the water, horizontal lines often retain a huge amount of water that must also be removed. One (1) method of accomplishing this is to simply remove or loosen one of the pipe connection fittings, such as a VICTAULIC® fitting. While this method certainly works, it is typically accompanied by large amounts of water uncontrollably draining out, often times all over flooring or surfaces that should preferably not get wet.

A number of devices exist which provide integral drainage outlets or drain valves incorporated into plumbing and irrigation systems. These devices typically include a pipe coupling for joining two (2) sections of piping together. The couplings comprise various types of valves or other sealing mechanisms which are operatively opened to provide a means to drain the plumbing system at the coupled location.

These devices can be seen by example in the following U.S. patent references: U.S. Pat. No. 3,603,508 issued in the name of Ingram; U.S. Pat. No. 3,792,711 issued in the name of Bedard; U.S. Pat. No. 5,094,480 issued in the name of Boileau; and, U.S. Pat. No. 6,491,056 issued in the name of Gibb.

While these solutions may provide a benefit related to their respective, particular objectives, each suffers from one (1) or more disadvantage or deficiency with respect to design, function, or effectiveness. These devices fail to provide a simple yet effective means to drain excess fluid from a plumbing system, which can be utilized with existing plumbing systems and pipe couplings.

Accordingly, there exists a need for a means by which water can be drained from sections of a fire sprinkler system in a controlled manner without having to replace existing pipe couplings. The development of the present invention substantially departs from the conventional solutions and in doing so fulfills this need.

SUMMARY OF THE INVENTION

In view of the foregoing art, the inventor recognized the aforementioned inherent problems and observed the need for a novel means by which water can be simply and effectively drained from sections of a plumbing system in a controlled manner and thus, the object of the present invention is to solve the aforementioned disadvantages and provide for this need.

Another object of the present invention is to provide a device which can easily attach to and be used with various types of existing plumbing systems such as fire sprinkler system lines.

Another object of the present invention is to provide a device which prevents fluid spills when plumbing systems are drained.

Another object of the present invention is to provide a device which functions provides free access to a pipe coupling when in use.

Yet another object of the present invention is to provide a device which provides a watertight seal with the plumbing system being drained.

Yet another object of the present invention is to provide a device which enables the drained fluid to be directed to a selected location.

Yet another object of the present invention is to provide a device which has an extended useful life.

Yet another object of the present invention is to provide a device which is quickly and easily applied and removed from a plumbing system.

Yet another object of the present invention is to provide a system which is simple and intuitive to use with little to no training.

Yet another object of the present invention is to provide a system which is durable and economical to manufacture.

To achieve the objects of the invention, embodiments of the present device include an attachable drain collar for plumbing system couplings comprising two (2) planer sidewalls, each having a semicircular recess circumscribed from a top edge and a curved bottom surface affixed to a radial lower edge of each of the sidewalls. The sidewalls and bottom surface form a three-sided hollow collar adapted to fit around a bottom portion of a pipe and pipe coupling to collect fluid. An orifice is provided in the bottom surface at a central location for draining the fluid and a drain fitting is aligned with the orifice, protruding downward from an exterior side of the bottom surface to attach a drain hose. A gasket is affixed to a radial edge of each recess to form a watertight seal between the sidewalls and the pipe. A pair of strap ears is disposed on opposing ends of the bottom surface, each provided with a strap slot. Two (2) pairs of elongated straps are attached to each of the strap slots and opposing straps include complimentary sides of a hook-and-loop type fastener. An access slot is disposed in opposing ends of the bottom surface between the pair of strap ears to provide entry for a tool to disconnect the pipe coupling.

Furthermore, the described features and advantages of the invention may be combined in various manners and embodiments as one skilled in the relevant art will recognize. The invention can be practiced without one (1) or more of the features and advantages described in a particular embodiment.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | attachable drain collar for plumbing system couplings |
| 20 | sidewall |
| 22 | bottom |
| 23 | sidewall radial edge |
| 24 | access slot |
| 25 | strap ear |
| 26 | strap slot |
| 27 | recess radial edge |
| 40 | gasket |
| 41 | orifice |
| 42 | drain fitting |
| 50 | strap |
| 52 | hook-and-loop fastener |
| 100 | coupling |
| 105 | fastener |
| 110 | pipe |
| 120 | water |
| 130 | flexible hose |

DETAILED DESCRIPTION OF THE PREFERRED EMBODIMENT

Figure 1:
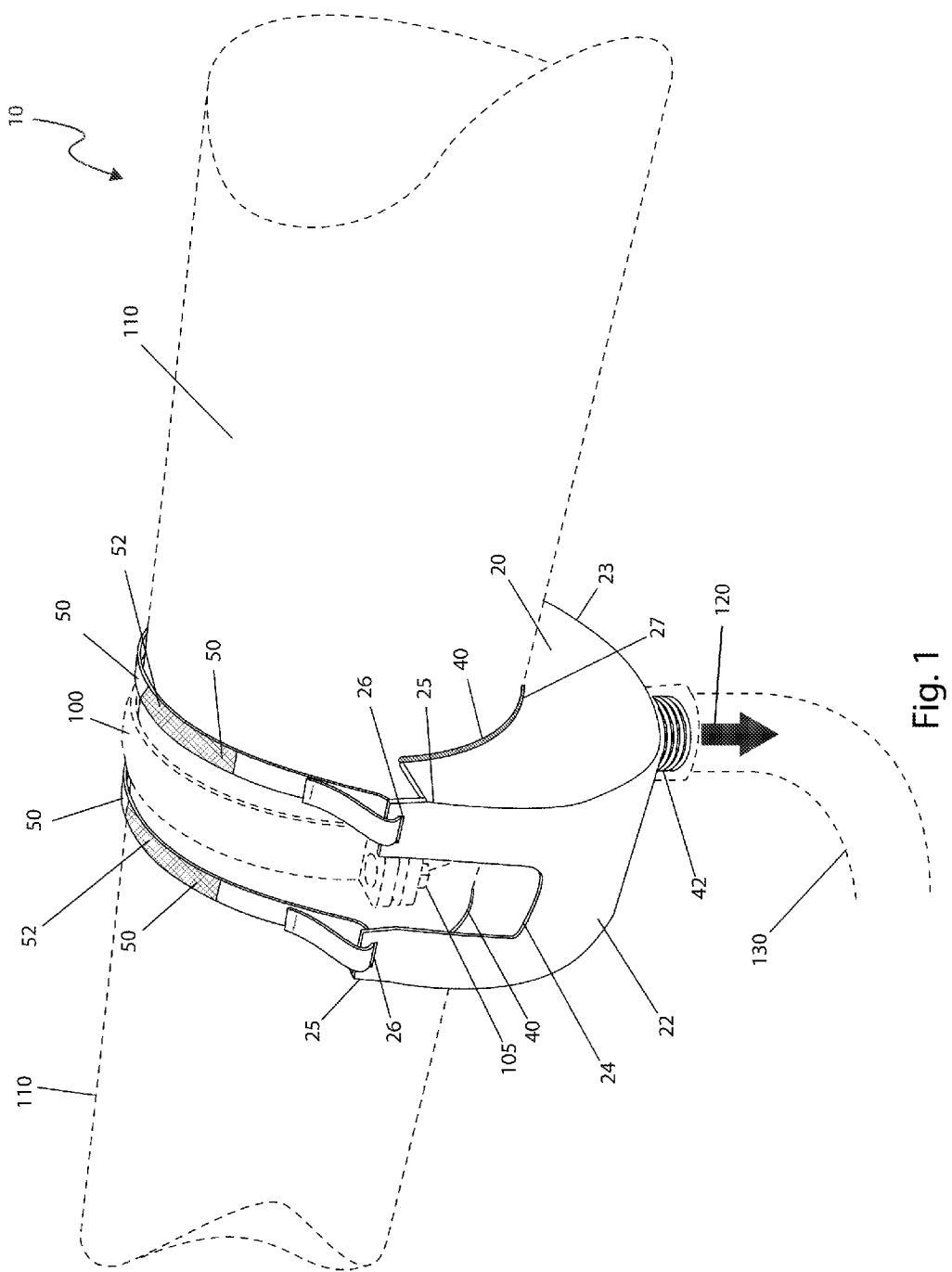
FIG. 1 is a side perspective view of a drain for a plumbing system coupling 10, according to a preferred embodiment of the present invention.
Figure 2:
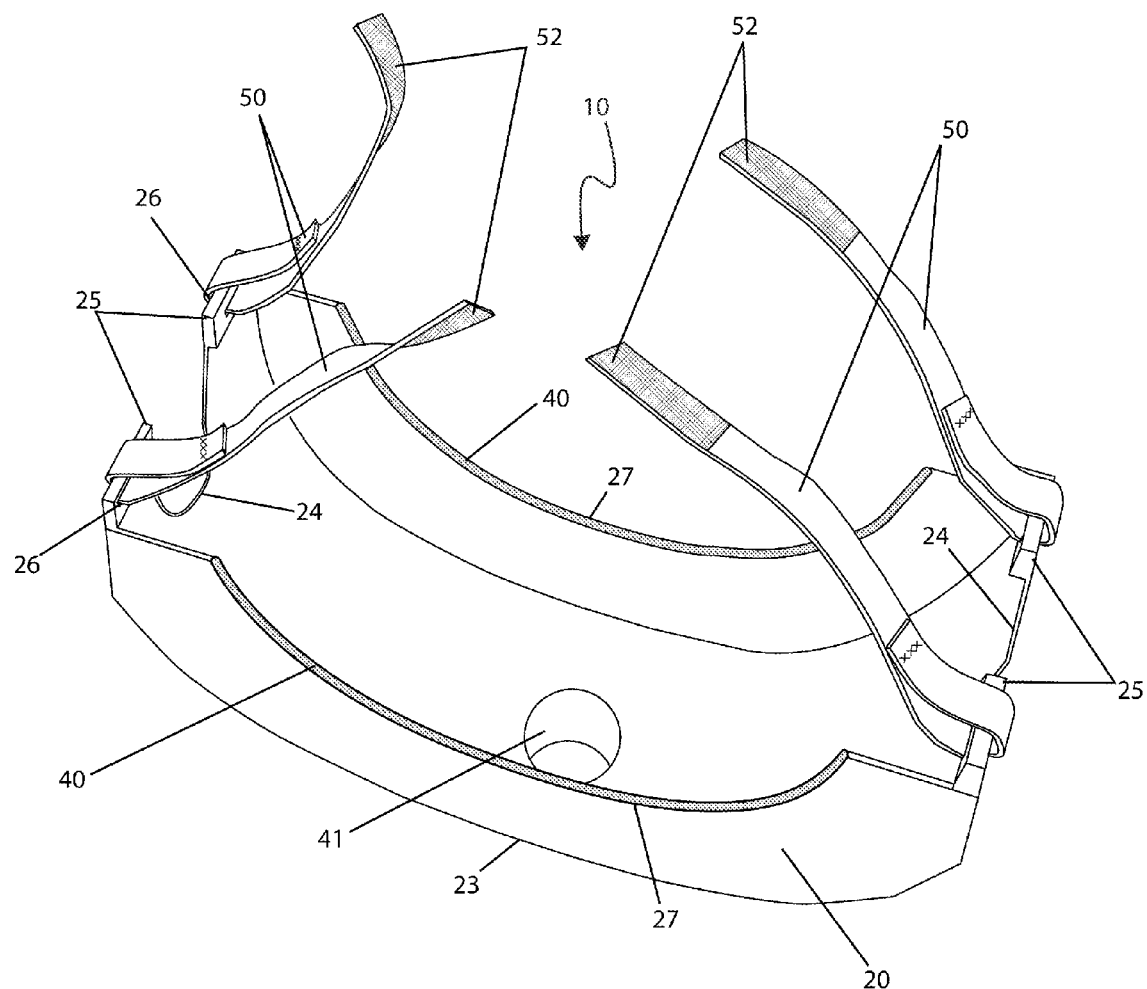
FIG. 2 is a top perspective view of the drain for a plumbing system coupling 10, according to a preferred embodiment of the present invention; and, FIG. 3 is a bottom perspective view of the drain for a plumbing system coupling 10, according to a preferred embodiment of the present invention.
Figure 3:
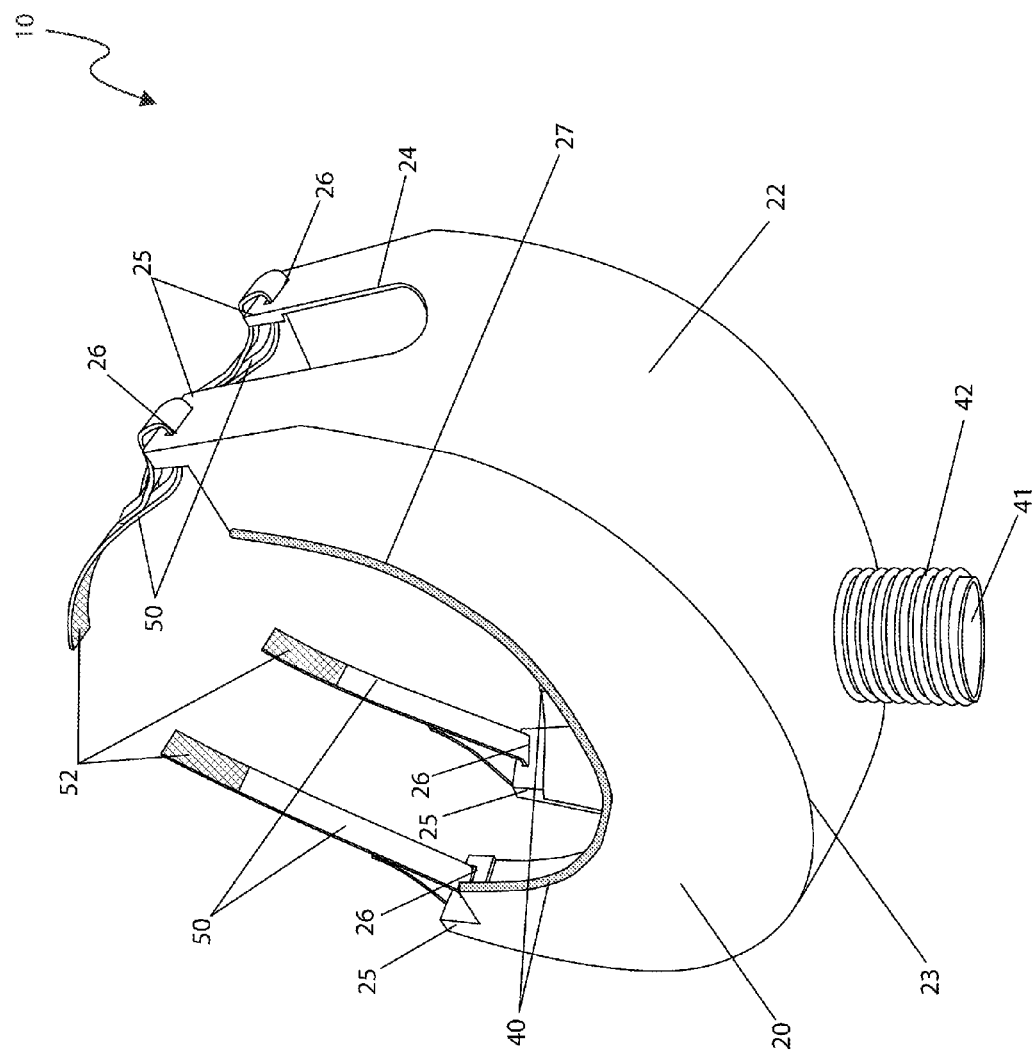

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a attachable drain collar for plumbing system couplings (herein described as the "device") 10, which provides a removably attachable fluid capturing and draining means to plumbing systems comprising compression-type radial pipe joints being secured and sealed using circumferential couplings 100. The device 10 may be utilized to redirect drained water 120 from such plumbing systems as, but not limited to: fire sprinkler systems, irrigation systems, and the like. The device 10 comprises a hollow plastic "U"-shaped collar which wraps around a bottom portion of a pipe coupling 100, thereby capturing a flow of water 120 which leaks from the coupling 100 as fastener portions 105 of the coupling 100 are loosened. The device 10 further comprises an integral watertight gasket 40 being applied to an exterior wall portion of the pipe 110 to prevent leakage from the device 10. The device 10 is held in place around the pipe 110 using a pair of nylon straps 50 fastened with hook-and-loop fasteners 52. The device 10 also comprises a hose connection fitting 42 along a bottom surface allowing convenient connection to a common flexible hose 30 such as a garden hose or other temporary plumbing to allow controlled drainage of the water 120 which flows into the device 10 as the coupling 100 is loosened by a user. This procedure will allow any water 120 contained within a section of piping 110 to be drained away in a controlled manner.

Referring now to FIG. 1, a side perspective view of the device 10, according to the preferred embodiment of the present invention, is disclosed. The device 10 comprises a semi-circular hollow collar approximately four (4) to six (6) inches wide based upon a particular pipe size. The device 10 would be introduced in several models having differing inner diameters which correspond to a range of standard pipe sizes 110. The device 10 is to be capable of wrapping around a bottom portion of a standard semi-circular collar-type coupling fitting 100 utilized to join adjacent lengths of pipe 110 within a plumbing system. The couplings 110 are envisioned to comprise conventional units such as, for example, a VICTAULIC® fitting commonly found on sprinkler systems, or other equivalent piping joining technologies utilized in the industry.

The device 10 comprises a three-sided "U"-shaped vessel capable of capturing and temporarily retaining a volume of drained water 120. The device 10 comprises a one-piece structure further comprising a pair of sidewalls 20, and an interconnecting bottom surface 22. The device 10 is envisioned to be made using anti-corrosive plastic or metal materials produced in respective plastic molding or metal stamping processes common in the industry. The sidewalls 20 are arranged in a parallel manner with each other being perpendicular to the axis of the pipe 110 spanning across the bottom surface 22. Each sidewall 20 comprises a flat element defined by two (2) parallel and circumscribed half-circle recesses, the smaller recess being parallel to and wrapping around a bottom surface of the pipe 110. The smaller recess comprises a recess radial edge 27 defined by a minor diameter of the sidewall 20 which provides an attachment means to a gasket 40 along the edge region, thereby being in contact with the pipe 110 when installed. The gasket 40 comprises a latex or rubber sealing material having a circular cross sectional area and being affixed to an inner edge of the sidewall radial edge 27 using common adhesives or compound molding processes, thereby providing a flexible, compliant, and watertight seal between the sidewall 20 and the pipe 110. The bottom surface 22 further provides an attachment means to four (4) straps 50 along top edges thereof. The straps 50 are arranged in pairs which are in turn routed around a top portion of the pipe 110 and attached to each other, thereby securing the device 10 to the pipe 110 (see FIG. 2).

The bottom surface 22 comprises an arcuate member which spans between the greater diameters of the two (2) sidewalls 20 affixed to each sidewall radial edge 23 at right angles, thereby forming the three-sided, "U"-shaped vessel. The bottom surface 22 further comprises a pair of access slots 24 allowing a user to insert a tool to loosen the coupling fasteners 105, thereby propagating a flow of leaking water 120 from the coupling 100 and into the device 10. The access slots 24 are located along upper side surfaces of the bottom surface 22 forming a "U"-shaped opening which provides sufficient height and width so as to facilitate insertion of tools such as various drivers and wrenches used to loosen the couplings 100. The device 10 is to be installed upon the pipe 110 such that the access slots 24 are aligned with the coupling fasteners 105 as seen here.

Referring now to FIG. 2, a top perspective view of the device 10, according to the preferred embodiment of the present invention, is disclosed. The device 10 comprises four (4) strap ears 25, four (4) strap slots 26, and four (4) straps 50. Each end of the bottom surface 22 comprises a pair of opposing upper edges which protrude in an upward direction forming the strap ears 25 which in turn provide an attachment means to respective strap portions 50 via strap slots 26 being integrally-molded or stamped into the ends of the bottom surface. The strap slots 26 comprise oval-shaped orifices having a suitable width and height to facilitate threading the strap 50 therethrough, being approximately one (1) inch wide. The proximal end portion of each strap 50 comprises a sewn loop passing through the strap slots 26, thereby providing a rugged permanent connection of the strap 50 to respective strap slots 26. Opposing pairs of straps 50 work in conjunction with each other by utilizing hook-and-loop fasteners 52 located along distal end portions, allowing the pairs of straps 50 to be wrapped around and secured to the pipe 110 (see FIG. 1).

Referring now to FIG. 3, a bottom perspective view of the device 10, according to a preferred embodiment of the present invention, is disclosed. The device 10 comprises an orifice 41 through a lower central portion of the bottom surface 22 and drain fitting 42 being integrally molded into or affixed to the bottom surface 22 aligned with the orifice 41, providing a redirection and disposal means of water 120 received from the loosened coupling 100, thereby allowing disposal of the water flow 120 in a controlled manner and avoiding possible property damage and/or a laborious cleanup task. The drain fitting 42 preferably comprises a standard three-quarters (¾) inch threaded plastic, brass, or stainless steel male fitting enabling easy connection of a standard garden hose 130 (see FIG. 1). However, it is understood that other forms of permanent or temporary plumbing may also be connected to the drain fitting 42 with equal benefit.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of utilizing the device 10 may be achieved by performing the following steps: disabling any pressurizing equipment connected to the plumbing system such as pumps, which may be applying a pressure thereto; remotely relieving internal water pressure present within the pipe portions 110 using appropriate components, if the plumbing system is so equipped; mounting the device 10 to a system coupling 100 joining two (2) lengths of piping 110 which need to be drained; aligning and centering the device 10 upon the joining coupling 100; securing the device 10 tightly to the pipe portions 110 adjacent to the coupling 100 by wrapping the two (2) pairs of straps 50 around the joined pipes 110; connecting the hook-and-loop fasteners 52 tightly to each other, thereby causing slight compression of the gasket 40 against an outer surface of the pipe 110 to form a watertight seal; threadingly attaching a flexible hose 130 or other temporary plumbing means to the drain fitting 42; routing the hose 130 to a desired water 120 receptacle being suitable to receive a flow of water 120 from the device 10; loosening the coupling fasteners 105 using a common driver or wrenching tool by inserting the tool through the access slots 24 in a sequential or alternating side-to-side manner until establishing a flow of water 120 therefrom; allowing the water 120 to flow into the device 10 and subsequently through the drain fitting 42 and attached garden hose 130; allowing water 120 to drain for a period of time until the flow of water 120 is exhausted; repeating the draining procedure described above at additional couplings 100 in like manner as required to empty the plumbing system; and, benefiting from controlled disposal of residual water 120 within a plumbing system in a cleanly manner using the present invention 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An attachable drain collar for plumbing system couplings comprising:
   a fluid collecting chamber comprising a walled interior reservoir bound by a curved bottom;
   an orifice in said bottom for draining fluid from said fluid collecting chamber; and,
   a means for attaching said fluid collecting chamber below a coupling of a plumbing system;
   wherein said walled interior reservoir further comprises a pair of parallel semicircular recesses disposed at an upper edge; and,
   wherein said pair of semicircular recesses each comprise a diameter sized to fit around a bottom side of a pipe of said plumbing system.

2. The collar of claim 1, wherein said means for attaching further comprises at least one pair of complimentary strap fasteners.

3. The collar of claim 2, wherein said means for attaching further comprises two pairs of complimentary strap fasteners.

4. The collar of claim 3, wherein opposing sides of said two pairs of complimentary strap fasteners further comprise complimentary sides of a hook-and-loop type fastener.

5. The collar of claim 2, wherein said fluid collecting chamber further comprises at least one pair of strap ears disposed on opposing upper ends;
   wherein each of said strap ears comprise a strap slot to insertingly attach said at least one pair of strap fasteners.

6. The collar of claim 5, wherein said fluid collecting chamber further comprises two pairs of strap ears;
   wherein said means for attaching further comprises two pairs of complimentary strap fasteners; and,
   wherein opposing sides of said two pairs of complimentary strap fasteners further comprise complimentary sides of a hook-and-loop type fastener.

7. The collar of claim 1, wherein said semicircular recess diameter fits snugly around said bottom side of said pipe about said coupling.

8. The collar of claim 7, wherein each of said pair of semicircular recess further comprises an affixed gasket to form a water-tight seal between said fluid collecting chamber and said pipe.

9. The device of claim 5, wherein said walled interior reservoir further comprises a pair of parallel access slots disposed perpendicularly to said pair of semicircular recesses;
   wherein said pair of access slots provide entry for a tool to disconnect said pipe coupling.

10. The collar of claim 9, wherein said fluid collecting chamber further comprises a drain fitting aligned with said orifice and protruding from an exterior side of said bottom surface for removably attaching a drain hose.

11. The collar of claim 10, wherein said drain fitting further comprises a threaded exterior surface to threadingly attach said drain hose.

12. The collar of claim 10, wherein said fluid collecting chamber further comprises:
two parallel planer semicircular sidewalls, wherein each said semicircular recess is circumscribed from a top edge;
wherein said curved bottom surface is affixed to a radial lower edge of each of said sidewalls;
wherein said sidewalls and said bottom surface form a three-sided fluid collecting chamber adapted to fit around a bottom portion of a pipe and pipe coupling to collect fluid.

13. The collar of claim 12, wherein said fluid collecting chamber further comprises two pairs of strap ears;
wherein said means for attaching further comprises two pairs of complimentary strap fasteners; and,
wherein opposing sides of said two pairs of complimentary strap fasteners further comprise complimentary sides of a hook-and-loop type fastener.

14. The collar of claim 13, wherein said semicircular recess diameter fits snugly around said bottom side of said pipe about said coupling.

15. The collar of claim 14, wherein each of said pair of semicircular recesses further comprises an affixed gasket to form a water-tight seal between said fluid collecting chamber and said pipe.

16. The collar of claim 15, wherein said drain fitting further comprises a threaded exterior surface to threadingly attach said drain hose.

17. An attachable drain collar for plumbing system couplings comprising:
two parallel planer semicircular sidewalls, each having a semicircular recess circumscribed from a top edge;
a curved bottom surface affixed to a radial lower edge of each of said sidewalls;
wherein said sidewalls and said bottom surface form a three-sided hollow collar adapted to fit around a bottom portion of a pipe and pipe coupling to collect fluid;
an orifice disposed in said bottom surface at a central location for draining said fluid;
a drain fitting aligned with said orifice and protruding from an exterior side of said bottom surface for removably attaching a drain hose;
a gasket affixed to a radial edge of each recess to form a watertight seal between said sidewalls and said pipe;
a pair of strap ears disposed on opposing ends of said bottom surface;
a strap slot in each of said strap ears;
an elongated strap insertingly attached to each of said strap slots;
wherein said straps comprise complimentary sides of a hook-and-loop type fastener;
an access slot disposed in both of said opposing ends of said bottom surface between said pair of strap ears;
wherein said access slots provide entry for a tool to disconnect said pipe coupling.

18. The collar of claim 17, wherein said drain fitting further comprises a threaded exterior surface to threadingly attach said drain hose.

19. A method of draining a plumbing system utilizing an attachable drain collar for plumbing system couplings, comprising the steps of:
disabling any pressurizing equipment connected to a plumbing system;
remotely relieving internal water pressure present within pipes;
positioning said attachable drain collar for plumbing system couplings subjacent to a pipe coupling joining two lengths of piping which need to be drained;
aligning and centering a hollow collar of said attachable drain collar for plumbing system couplings upon said pipe coupling;
positioning said attachable drain collar for plumbing system couplings such that a bottom portion of said two lengths of piping are fit within a pair of semicircular recesses in a pair of sidewalls;
securing said attachable drain collar for plumbing system couplings tightly to said lengths of piping by wrapping the two pairs of straps around said lengths of piping;
connecting complimentary ends of hook-and-loop fasteners on opposing ends of said pair of straps tightly to each other, thereby causing a compression of a gasket against an outer surface of said lengths of piping forming a watertight seal;
threadingly attaching a flexible drain hose to a drain fitting;
routing said drain hose to a desired water receptacle suitable to receive a flow of water from said plumbing system;
loosening a plurality of fasteners of said pipe coupling using a wrenching tool by inserting said tool through access slots disposed in both opposing ends of a bottom surface between a pair of strap ears of said collar in a sequential or alternating side-to-side manner until establishing a flow of water;
allowing said water to flow into said hollow collar and subsequently through said drain fitting and attached drain hose; and,
repeating described draining procedure at additional couplings in like manner as required to empty said plumbing system.

* * * * *